United States Patent [19]

Comparato

[11] Patent Number: 4,738,569
[45] Date of Patent: Apr. 19, 1988

[54] APPARATUS FOR FLUIDIZING A PARTICULATE MATERIAL IN A CONVEYING GAS

[75] Inventor: Joseph R. Comparato, Bloomfield, Conn.

[73] Assignee: Combustion Engineering, Inc., Windsor, Conn.

[21] Appl. No.: 908,053

[22] Filed: Sep. 16, 1986

[51] Int. Cl.⁴ ............................................. B65G 53/38
[52] U.S. Cl. .................................... 406/138; 110/245; 34/57 A
[58] Field of Search ......................... 406/123, 138, 142; 110/245; 34/57 A; 432/58

[56] References Cited

U.S. PATENT DOCUMENTS

| | | | |
|---|---|---|---|
| 2,972,501 | 2/1961 | Feinman | 406/138 |
| 3,915,657 | 10/1975 | Staffin et al. | 110/245 X |
| 4,203,689 | 5/1980 | Kraxner et al. | 406/123 |
| 4,530,290 | 7/1985 | Comparato | 110/245 |

Primary Examiner—Sherman D. Basinger
Assistant Examiner—James M. Kannofsky
Attorney, Agent, or Firm—William W. Habelt

[57] ABSTRACT

A fluidizing feed apparatus (20) for supplying particulate material to a fluidized bed furnace (12) having a housing (22) which defines a chamber which is divided by a multi-tiered perforated distribution plate (24) into a plurality of independent gas plenums (26, 36, 52) beneath the respective tiers (23, 25, 27) of the distribution plate, a particulate fluidizing plenum (28) above the upper outer position (25) of the distribution plate (24) and a particulate feed plenum (30) superadjacent the lower central portion (25) of the distribution plate (24). Conveying gas is independently fed under pressure to each of the gas plenums to pass upwardly through the respective tiers of the perforated distribution plate.

1 Claim, 3 Drawing Sheets

APPARATUS FOR FLUIDIZING A PARTICULATE MATERIAL IN A CONVEYING GAS

BACKGROUND OF THE INVENTION

The present invention relates to an apparatus for fluidizing a particulate material in a conveying gas for transport and distribution, and, more particularly, to such an apparatus adapted for feeding particulate material in a conveying gas to a fluidized bed furnace.

In a typical present day fluidized bed furnace, particulate fuel, such as coal having a top size ranging from about 3.0 to about 6.5 mm, is typically fed to and combusted within a fluidized bed of similar sized particulate material at relatively low temperatures of 760° C. to 925° C. If the fuel being burned contains sulfur, it is customary that the particulate material making up the bed be comprised of a sulfur absorbent, most commonly limestone, in addition to the particulate fuel.

Fluidizing air, which also serves as combustion air, supplied to the fluidized bed from an air plenum located beneath the bed support plate. The fluidizing air passes upwardly from the air plenum into the fluidized bed through a plurality of holes in the bed support plate at a flow rate sufficiently high to fluidize the particulate material within the fluidized bed.

The performance of a fluidized bed for sulfur capture and fuel combustion is known to be improved by recycling solids separated from the flue gas back to the combustor. Recycling of these solids increases the overall residence time of the solids in the combustor and the concentration of solids in the reaction volume above the bed. The recycle solids are typically fed into the bed in a manner similar to that used for feeding fresh particulate material, such as fuel and sulfur absorbent. However, since recycle solids are usually at an elevated temperature, of a fine particulate size and dry, it is generally more difficult to feed recycle solids in a controlled manner in conventional feeders than it is to feed fresh particulate material.

A number of different approaches have been suggested for feeding fresh or recycled particulate material to the bed, including overbed feed systems and underbed feed systems. One particular underbed feed system suitable for feeding particulate material to a fluidized bed is disclosed in U.S. Pat. No. 4,356,779. As disclosed therein, a fuel feeder is disposed beneath the fluidized bed combustor for entraining fuel in air and then feeding that fuel upwardly into the combustor. The feeder housing defines a chamber which is divided into upper and lower sections by a horizontally disposed perforated distributor plate. The particulate fuel to be supplied to the fluidized bed is fed into the upper chamber above the perforated distributor plate while conveying air is supplied to the lower chamber beneath the perforated distributor plate. The air supplied to the lower chamber passes upwardly through the perforated distributor plate to fluidize and entrain the particulate coal in the upper region of the chamber. The entrained coal is then carried upwardly from the chamber to the fluidized bed boiler through transport lines which open to the fluidizing chamber through the roof of the feeder. In the feeder disclosed in U.S. Pat. No. 4,356,779, there is no provision to permit control of the output of particulate material through each of the individual transport lines. Assuming that the lengths of the transport lines from the feeder to its endpoint destination are equal, the output of particulate material from the disclosed feeder would be necessarily evenly distributed amongst the various transport lines leading from the feeder. No provision is made to permit an uneven or selective distribution of the output or to compensate for an inherent uneven distribution of output due to unequal line length.

A feeder apparatus which addresses this disadvantage is disclosed in U.S. Pat. No. 4,530,290 granted to applicant on July 23, 1985. The feeder comprises a housing defining a chamber which is divided by means of a perforated bed support plate, in the form of an inverted truncated cone, disposed thereacross into a gas plenum subadjacent the plate and a particulate fluidizing plenum superadjacent the plate. Gas supply means open into the gas plenum for conveying a pressurized conveying gas therethrough to pass upwardly through the perforated bed support plate to fluidize particulate material deposited in the particulate fluidizing plenum so as to establish a discrete bed of fluidized particulate material superadjacent the plate. Particulate material is fed to the fluidizing plenum through a feed column penetrating the roof of the housing and extending downwardly therein to terminate in the vicinity of the bed support plate so that particulate material is supplied to the chamber at a location beneath the surface of the discrete bed. A plurality of vertically positionable transport conduits extend into the particulate fluidizing chamber so as to open into the splash zone at a desired distance above the surface of the discrete bed to receive particulate material and conveying gas from the splash zone.

One problem encountered in such fludized feeders is sealing the feed column, i.e. the standpipe, through which particulate material is supplied to the feeder from the fluidizing air being supplied to the fludizing chamber to entrain the particulate fuel for transport.

Accordingly, it is an object of the present invention to provide an apparatus for fluidizing a particulate material in a conveying gas wherein the particulate material feed column is inherently sealed from the fluidizing air supplied to the fluidizing chamber.

It is a further object of the present invention to provide such an apparatus wherein the flow of particulate material from the feed column into the bed may be readily controlled, especially for materials such as recycle solids.

SUMMARY OF THE INVENTION

The apparatus of the present invention comprises a housing defining a chamber therein which is divided into a gas supply chamber, a particulate feed plenum, and a particulate fluidizing plenum by means of a unique multi-tiered perforated gas distribution plate disposed within the housing across the chamber. The distribution plate is constructed in a multi-tier form having at least a lower central perforated bed support portion, an upper outer perforated bed support portion, and a wall portion extending therebetween so as to define a central recess cavity which serves as the particulate feed plenum. The particulate fluidizing plenum is formed superadjacent the outer portion of the distribution plate above and about the particulate feed plenum.

The gas supply chamber located beneath the multi-tier distribution plate is partitioned into at least a first gas plenum opening through the perforated lower portion of the distribution plate and a second gas plenum opening through the perforated central portion of the distribution plate into the particulate feed plenum formed by the central recess cavity superadjacent the central portion of the plate. First and second gas supply means are provided for independently supplying pressurized conveying and fluidizing gas into the first and second gas plenums respectively. Gas supplied into the first gas plenum passes upwardly therefrom through the gas passages in the outer portion of the perforated distribution plate to fluidize the particulate material in the particulate fluidizing plenum so as to establish within the housing a discrete bed of fluidized particulate material superadjacent the outer portion of the bed support plate and a splash zone above the discrete bed. A fraction of the fluidized particulate material carries over the discrete bed into the splash zone as bubbles of upwardly passing conveying gas erupt through the surface of the discrete bed. A plurality of transport conduits penetrate the housing and extend into the particulate fluidizing plenum so as to open into the splash zone at a desired distance above the surface of the discrete bed. The transport conduits received particulate material and conveying gas from the splash zone and carry the received particulate material in the conveying gas to a desired destination.

A central particulate feed tube penetrates the housing and extends downwardly into the fluidized plenum with its outlet positioned superadjacent the central portion of the distribution plate so as to deposit particulate material into the particulate feed plenum formed in the recessed central cavity superadjacent the central portion of the distribution plate. Pressurized fluidizing gas is selectively and controllably supplied to the second gas plenum to pass therefrom through the gas flow passages in the central portion of the distribution plate to fluidize the particulate material supplied to the particulate feed plenum as desired to facilitate migration of the fluidized feed material into the particulate fluidizing plenum superadjacent the outer portion of the support plate while simultaneously permitting a material head seal to be formed in particulate feed conduit so as to prevent the pressurized conveying gas supplied to the feeder from passing through the feed conduit back to the particulate storage silos.

BRIEF DESCRIPTION OF THE DRAWING

Other objects, features and advantages of the present invention will be evident from the following description of the preferred embodiment of the fluidizing feed apparatus of the present invention and the accompanying drawing wherein the feed apparatus is utilized to supply particulate material to a fluidized bed furnace.

DESCRIPTION OF A PREFERRED EMBODIMENT

Figure 1:
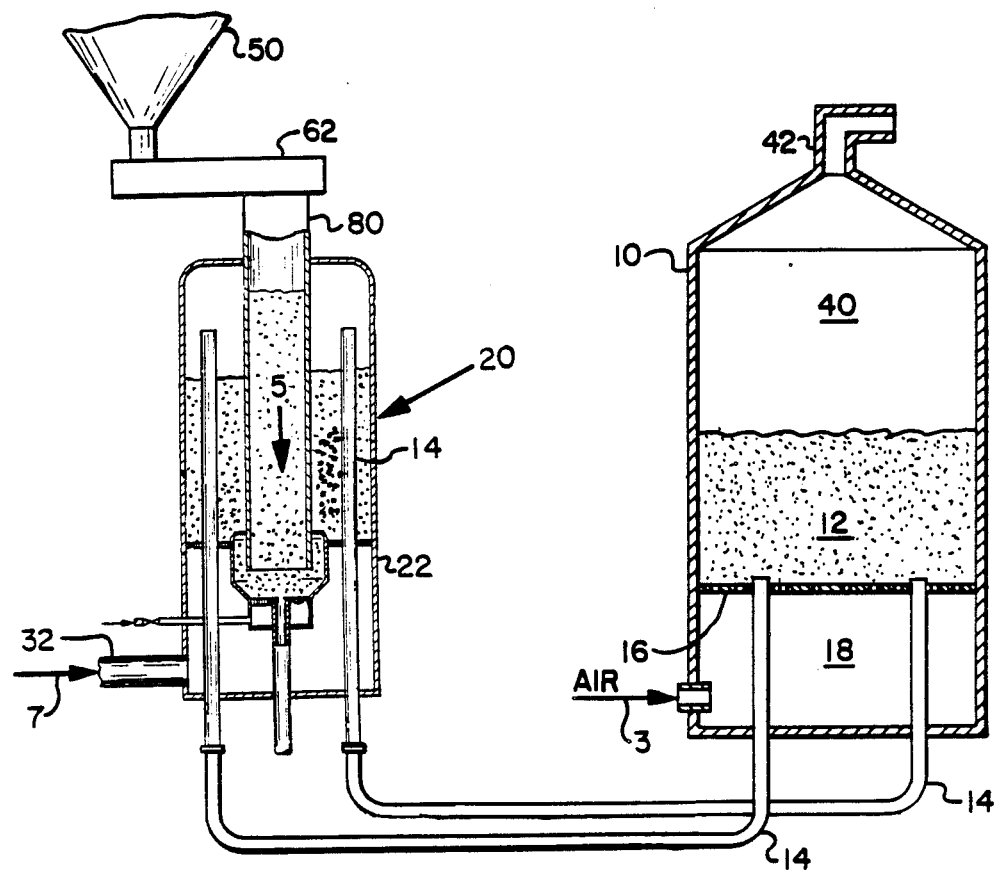
FIG. 1 is a diagrammatic view, partly in section, showing the feed apparatus of the present invention supplying particulate material, such as particulate coal and sulfur absorbent or recycle solids, to a fluidized bed furnace.

Referring now to FIG. 1, there is depicted therein a fluidized bed furnace 10 wherein a sulfur-containing fuel, such as particulate coal, is combusted in a fluidized bed 12 of particulate material which includes a sulfur oxide absorbent. Typically, the sulfur oxide absorbent is selected from the group consisting of limestone, lime, dolomite and soda ash. It is to be understood that the term limestone used herein is to be read to encompass other sulfur oxide absorbents including, but not limited to, dolomite, lime, soda ash or unreacted absorbent in the recycle solids, and that the term particulate coal as used herein is to be read to include other particulate fuels or recycle solids.

Particulate coal is supplied to the furnace fluidized bed 12 through a plurality of transport lines 14 which extend upwardly into the bed through the bed support plate 16 from the fluidizing feed apparatus 20. Combustion air is supplied to the air plenum 18 located beneath the fluidized bed support plate 16 and passes upwardly from the air plenum 18 into the fluidized bed 12 through a plurality of airports in the bed support plate 16 at a flow rate sufficiently high enough to fluidize the particulate material within the fluidized bed 12. The particulate coal combusts within the fluidized bed 12 and the freeboard region 40 thereabove to form hot flue gas which passes out of the fluidized bed furnace 10 through flue 42 to downstream steam generating equipment, not shown.

The feed apparatus 20 of the present invention is depicted disposed alongside the fluidized bed furnace 10 and connected therewith by the transport lines 14 which extend downwardly from the feed apparatus 20, thence horizontally over to the fluidized bed furnace 10, and thence upwardly through the bed support plate 16 to open into the fluidized bed 12. The feed apparatus 20 comprises a housing 22, preferably a cylindrical housing, defining a chamber therein which is divided by a multi-tiered perforated gas distribution plate 24 into a first gas plenum 26 disposed beneath the outer portion 3 of the distribution plate 24, a particulate fluidizing plenum 28 disposed above the outer portion 23 of the distribution plate 24, a particulate feed plenum 30 formed superadjacent the central portion 25 of the distribution plate 24, and a second gas plenum 36 disposed beneath the central portion 25 of the distribution plate 24.

Conveying gas 7 passes into the fluidizing feed apparatus 20 through gas supply means 32 which opens into the gas plenum 26 beneath the outer portion 23 of the distribution plate 24 through an opening in the housing 22. The pressurized conveying gas 7 supplied to the gas plenum 26 passes upwardly through a plurality of flow passages 34 in the outer portion 23 of the perforated distribution plate 24 into the fluidizing plenum 28 whereby the particulate material within the particulate fluidizing chamber 28 is fluidized so as to establish a discrete bed 60 of fluidized material above the distribution plate 24 and a splash zone 70 above the discrete bed of fluidized material.

A plurality of transport conduits 14 penetrate the housing 22 of the feeder 20 and provide a plurality of flow passages interconnecting the feeder 20 with the fluidized bed 12 in the fluidized bed furnace 10. The transport conduits 14 extend into the fluidizing plenum 28 of the housing 22 so as to open into the splash zone 70 at a distance above the discrete bed, that is at a distance above the surface 65 of the discrete bed which forms the interface between the discrete fluidized bed 60 and the splash zone 70. The transport conduits 14 receive particulate material and conveying gas from the splash zone 70 of the fluidizing plenum 28 and convey the received particulate material in the conveying gas from the feeder 20 to the fluidized bed 12 of the furnace 10.

The particulate materials to be fluidized, which when feeding a fluidized bed furnace may be a particulate coal, alone or together with a particulate sulfur oxide absorbent such as limestone and/or recycle solids, are supplied to the feed apparatus 20 from storage silo 50 via a conventional feeder 62 through particulate feed means 80. The particulate feed means 80 comprises a tubular conduit which penetrates the roof of the housing 22 and extends downwardly, preferably vertically, beneath the surface 65 of the discrete fluidized bed 60 so that particulate material passing therethrough is deposited into recessed central portion of the discrete bed 60 within the particulate feed plenum 30 superadjacent the central portion 25 of perforated distribution plate 24. A drain opening 38 is provided in distribution plate 24 in the central portion 25 thereof. A drain pipe 44 opens at its upper end to the drain opening 38 in the distribution plate 24 for receiving any non-fluidized particulate material from the particulate feed plenum 30. The drain pipe 44 extends externally to the housing 22 for removing the non-fluidized particulate material passing through the drain pipe 44 from the feed apparatus 20.

The plurality of transport conduits 14 penetrating the housing 22 and extending into the particulate fluidizing plenum 28 open into the splash zone 70 at a selected distance above the surface 65 of the discrete bed 60 for receiving particulate material and conveying gas from the splash zone 70. Particulate material is carried over from the discrete bed 60 into the splash zone 70 as bubbles of upwardly passing conveying gas erupt into the splash zone 70 from the surface 65 of the discrete bed 60.

At typical conveying gas velocities ranging from 5 to 10 feet per second depending upon the particle size of the material, a discrete bed 60 of fluidized particulate material having a well defined surface 65 is formed. The particle density within the discrete bed 60 is relatively uniform at a relatively high value on the order of 1000 pounds of particulate material per pound of conveying gas. However, at the surface 65 of the bed 60, there is an abrupt and very sharp drop in particle density with the particle density then continuously decreasing with increasing distance into the splash zone, i.e., increasing distance above the surface of the discrete bed.

It is envisioned that the average particle density in the splash zone 70 would be a function of the input particle flow rate. That is, it is believed that the introduction of particulate material into the splash zone 70 is a displacement controlled process. Therefore, once an equilibrium bed level is established, typically a few inches below the openings of the transport conduits 14, the rate of eruption of particulate material from the bed surface 65 into the splash zone 70 will be equal to the rate of input of particulate material to the discrete bed 60 through the particulate feed means 80 which open into the bed at a location below the surface of the discrete bed 60.

Figure 2:
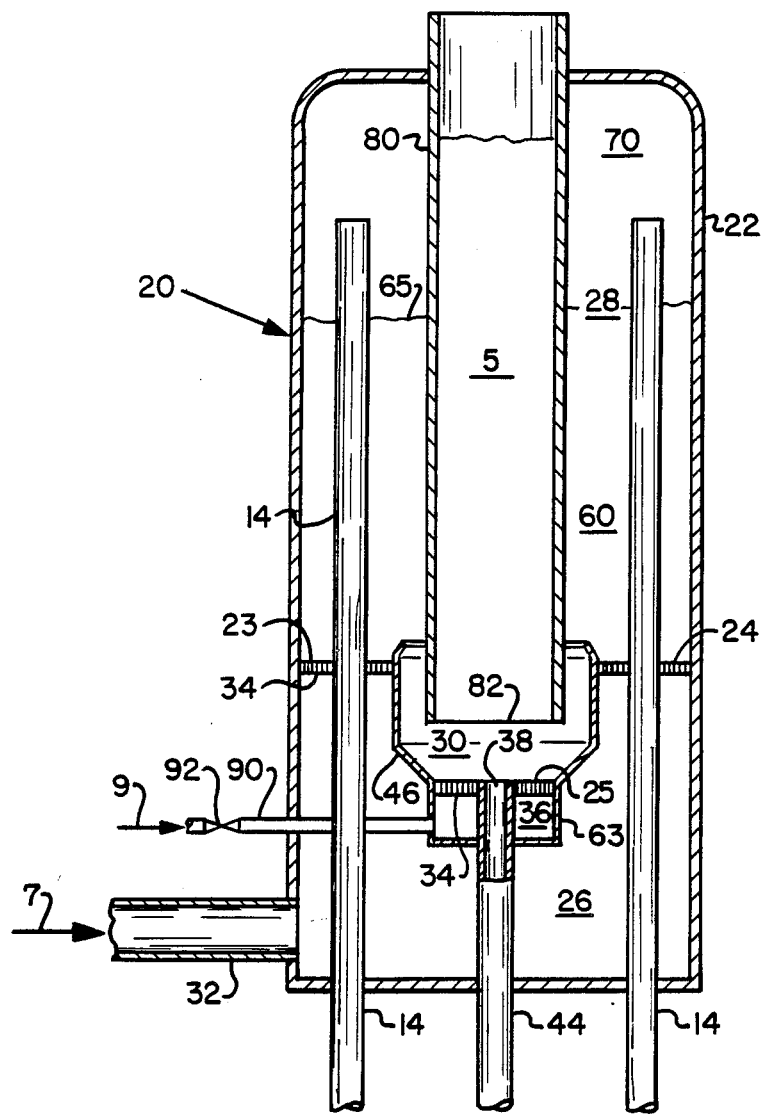
FIG. 2 is a cross-sectional elevational view of a preferred embodiment of the feeder apparatus of the present invention.

Although the transport conduits 14 may be tubular members having any desired cross-sectional shape, the transport conduits 14 illustrated in the preferred embodiment of the apparatus of the present invention shown in FIG. 2 comprise a plurality of stationary, elongated tubular members of circular cross-section arranged at circumferentially spaced intervals in the annular space between the particulate feed means 80 and the housing 22. The transport conduits 14 penetrate the housing 22 from below and extends vertically upward through the gas plenum 26, thence through the bed support plate 24 and the discrete bed 60 to open into the splash zone 70 at a uniform distance above the surface 65 of the discrete bed 60.

Figure 3:
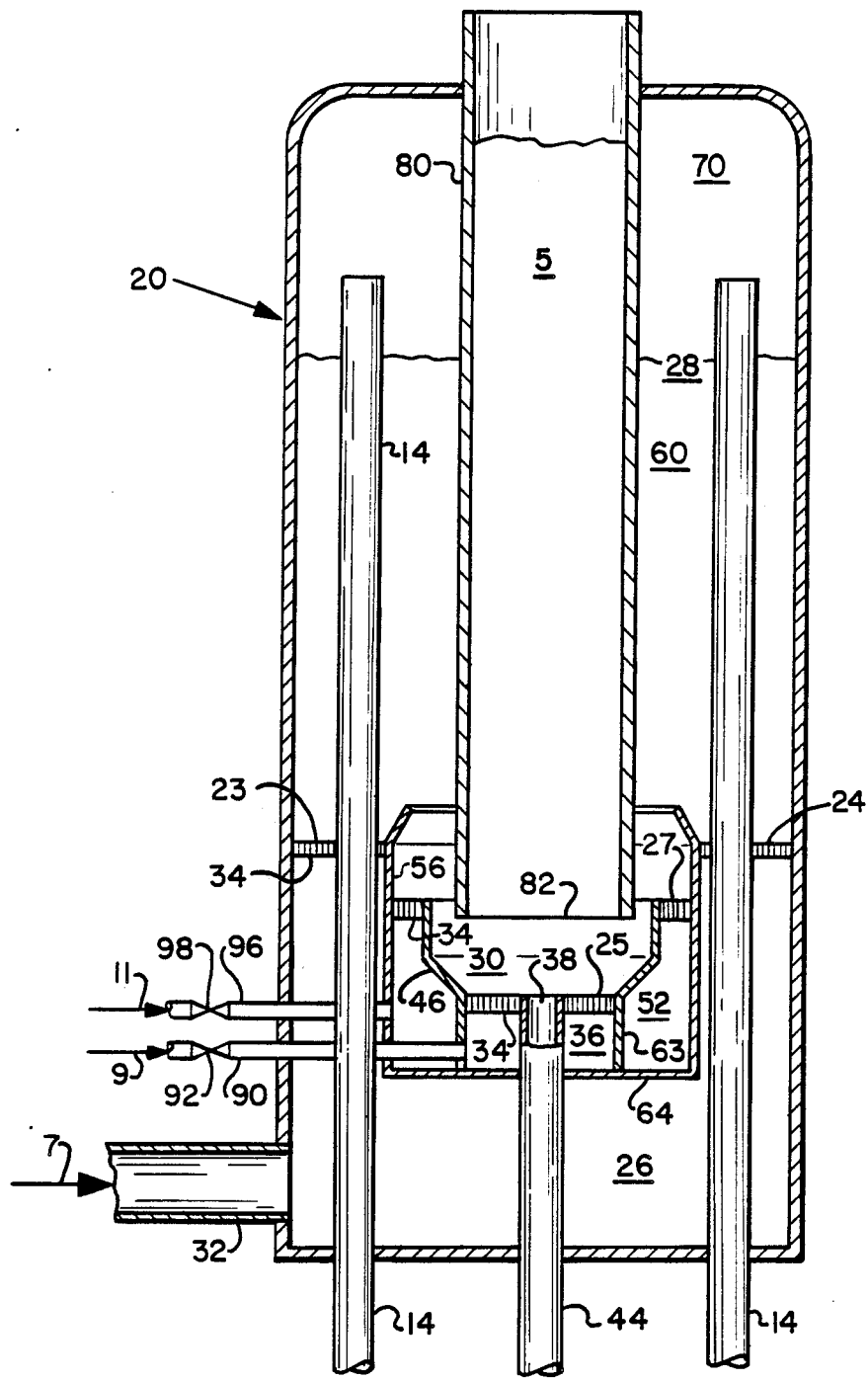
FIG. 3 is a cross-sectional elevational view of an alternate embodiment of the feeder apparatus of the present invention.

As shown in FIGS. 2 and 3, the distribution plate 24 of the feeder apparatus 20 of the present invention is constructed in a multi-tier form having at least a central portion 25 which is disposed within the feeder apparatus 20 beneath the feed conduit 80 at a elevation below that of the outer portion 23 of the plate. In the embodiment of the present invention shown in FIG. 2, the central portion 25 of the multi-tier distribution plate 24 is connected directly to the outer portion 23 of the plate 24 by an annular, upwardly extending, flow impervious wall 46 which links the central inner portion 25 and the annular outer portion 23 to form the distribution plate 24 which divides the feeder apparatus 20 into gas supply plenums beneath the distributor plate and particulate fluidizing plenums above the distributor plate. In the alternate embodiment shown in FIG. 3, an annular intermediate portion 27 of distributor plate 24 is disposed between the lower central portion 25 of the distributor plate 24 and the upper annular outer portion 23 thereof. The lower central portion 25 of the distributor plate 24 is linked to the intermediate annular portion 27 of the distributor plate 24 by an annular, upwardly extending, flow impervious wall 46 while the intermediate annular portion 27 of the distributor plate 24 is linked to the upper outer annular portion 23 of the distributor plate 24 by an annular, upwardly extending, flow impervious wall 56 so as to gather to form together the distribution plate 24 which divides the feeder apparatus 20 into a gas supply subchamber therebeneath, a particulate feed plenum and a particulate fluidizing plenum thereabove.

The column of particulate material 5 retained within the tubular conduit 80 is intended to provide a material head that seals the feeder 62 in silo 50 from the pressure in the fluidizing chamber 28 of the feed apparatus 20 thereby preventing the flow of air into the storage silo 50. The multi-tier distribution plate 24 of the feeder apparatus 20 of the present invention facilitates the formation and maintenance of this sealing material head by permitting the independent control of the supply of fluidizing gas into the particulate feed plenum 30 disposed above the central portion 25 of the multi-tiered perforated distribution plate.

The gas supply subchamber is partitioned by flow impervious partition means 63 into at least a first gas plenum 26 opening through the perforated outer portion 23 of the plate 24 to the particulate fluidizing chamber 28 and a second gas plenum 36, independent of the first gas plenum 26, subadjacent the central portion 25 of the perforated distribution plate 24 and opening therethrough to the particulate feed plenum 30. Additional conveying gas 9 is controllably supplied to the second gas plenum 36 through gas supply conduit 90 by selectively opening or closing the valve 92 to regulate the amount of additional conveying gas 9 supplied to the second gas plenum 36. The conveying gas thence passes upwardly through the openings 34 in the central portion 25 of the perforated distribution plate 24 into the particulate plenum 30 disposed superadjacent the central portion 25 of the distribution plate 24. By regulating the supply of conveying gas 9 to the second gas plenum 36 and, therefore, to the particulate feed plenum 30, control of the fluidization state of the particulate material within the particulate feed plenum 30 is obtained such that the standing leg of material 5 can be maintained within the feed conduit 80 independently of the fluidization within the fluidizing chamber 28 disposed about the feed conduit 80. In this manner, the supply of particulate material from the feeder apparatus 20 may be maintained at a given level while the supply of particulate material to the feed apparatus 20 can be maintained at a given flow rate independently of the feed of particulate material from the feeder apparatus 20 while still maintaining an effective material seal within the feed conduit 80.

In the embodiment shown in FIG. 3, the gas supply subchamber is further partitioned by flow impervious partition means 64 into a third gas plenum 52 independent of the first gas plenum 26 and second gas plenum 36 beneath the intermediate portion 27 of the perforated distribution plate 24 and is supplied independently of the first and second gas plenums with additional conveying gas 11 through gas supply conduit 96 in a controlled manner by opening or closing the valve 98 to regulate the flow of additional conveying gas 11 through the gas supply conduit 96. The additional conveying gas 11 supplied to the third gas plenum 52 passes upwardly therefrom through the openings 34 in the intermediate portion 27 of the perforated distribution plate 44 to pass upwardly into the fluidizing chamber 28 to fluidize the particulate material in transit from the particulate feed plenum 30 to the fluidizing plenum 28 disposed above the annular outer portion 23 of the perforated distribution plate 24. In this manner, the fluidization state of the particulate material in transit between the particulate feed plenum 30 and the particulate fluidizing plenum 28 may be selectively controlled by independently regulating the flow of additional conveying gas 11 through conduit means 96 to the third gas plenum 52. Preferably, the intermediate portion 27 of the multi-tiered perforated distribution plate 24 is disposed at a location between the central portion 25 of the distribution plate 24 and the upper outer portion 23 of the distribution plate 24 such that the upper surface of the intermediate portion 27 of the distribution plate 24 is disposed above the outlet 82 at the bottom of the particulate feed conduit 80.

In operation, particulate material 5 is supplied through the feed conduit 80 to the particulate feed plenum 30 disposed above the central portion 25 of the multi-tiered perforated distribution plate 24. In start-up and initial operation, the control valves 92 and 98 are closed so that no conveying gas is passed to either the second gas plenum 36 disposed beneath the central portion 25 of the multi-tiered distribution plate 24 or to the third gas plenum 52 disposed beneath the intermediate portion 27 of the multi-tiered perforated distribution plate 24. Therefore, the particulate material 5 will first completely fill the particulate feed plenum 30 superadjacent the central portion 25 of the distribution plate 24 and form this desired stand column of particulate material to effectively seal the feed conduit 80 from the back flow of conveying gas therethrough. Upon filling the particulate feed plenum 30, the material will overflow therefrom into the fluidizing chamber 28 to be fluidized in the conveying gas 7 supplied to the first gas plenum 26 and passing upwardly therefrom through the outer portion 23 of the multi-tiered perforated distribution plate 24 to form the discreet fluidized bed 60 within the feed apparatus 20.

Once the desired static head of material sealing the feed conduit 80 is established and particulate feed from the feeder apparatus is commenced, the control valves 92 and 98 can be selectively opened and closed to supply regulated flows of additional conveying gas 9 and 11 to the second gas plenum 36 and third gas plenum 52, respectively, so as to provide controlled states of fluidization in the particulate feed plenum 30 superadjacent the central portion 25 of the distribution plate 24 and in the transition region above the intermediate portion 27 of the distribution plate 24 so as to facilitate the flow of particulate material from the particulate feed plenum 30 to the particulate fluidizing plenum 28 while still maintaining an effective material plug to effectively seal the feed conduit 80.

Although the feed apparatus 20 of the present invention is shown as feeding a fluidized bed furnace 10, it is to be understood that the feed apparatus 20 of the present invention may be utilized in any situation where it is desired to transport a particulate material in a conveying gas to two or more end-point destinations. Accordingly, it is intended that the present invention be limited in spirit and scope only by the following claim.

I claim:

1. An apparatus for fluidizing a particulate material for transport in a conveying gas comprising:
   a. a vertically disposed housing defining a chamber therein;
   b. a gas distribution plate having a lower central portion, an upper outer portion, an intermediate portion disposed therebetween, a first wall portion extending between the lower central portion and the intermediate portion, and a second wall portion extending between the intermediate portion and the upper outer portion, the lower central portion, the intermediate portion and the upper outer portion of said distribution plate having gas flow passages formed therein, said distribution plate disposed within said housing so as to extend across said housing thereby dividing said chamber into a gas supply chamber beneath said distribution plate, a particulate fluidizing plenum above the upper outer portion of said bed support plate, and a particulate feed plenum superadjacent the central portion of the distribution plate;
   c. particulate feed means opening into the particulate fluidizing plenum so as to deposit particulate material into the particulate feed plenum superadjacent the lower central portion of said distribution plate;
   d. flow impervious partition means disposed subadjacent the lower central portion of said distribution plate for partitioning the gas supply chamber into a first gas plenum opening through the gas flow passages of the outer portion of said distribution plate into the particulate fluidizing plenum, a second gas plenum opening through the gas flow passages of the central portion of said distribution plate into the particulate feed plenum, and a third gas plenum opening into the particulate feed plenum through the gas flow passages of the intermediate portion of said distribution plate lying outwardly of the central portion and inwardly of the outer portion of said distribution plate;
   e. first gas supply means opening into the first gas plenum for supplying pressurized conveying gas to the first gas plenum to pass therefrom through the gas flow passages in the outer portion of said distribution plate whereby at least a portion of the particulate material fed to the particulate fluidizing plenum is fluidized so as to establish a discrete bed of fluidized material adjacent to said distribution plate and a splash zone within the particulate fluidizing plenum above said discrete bed;

f. second gas supply means opening into the second gas plenum for controllably supplying pressurized fluidizing gas to the second gas plenum independently of the supply of pressurized conveying gas to the first gas plenum to pass therefrom through the gas flow passages in the central portion of said distribution plate whereby the particulate material supplied to the particulate feed plenum may be selectively and controllably fluidized;

g. third gas supply means opening into the third gas plenum for controllably supplying pressurized fluidizing gas to the third gas plenum independently of the supply of pressurized conveying gas to the first gas plenum and independently of the supply of pressurized fluidizing gas to the second gas plenum to pass therefrom through the gas flow passages in the intermediate portion of said distribution plate whereby the particulate material in transit from the particulate feed plenum to the particulate fluidizing plenum may be selectively and controllably fluidized; and h. a plurality of transport conduits, each penetrating said housing and having an inlet opening into the splash zone formed within the chamber of said housing for receiving particulate material and conveying gas therefrom and conveying said received particulate material from said housing in the conveying gas.

* * * * *